United States Patent
Cyzs

(10) Patent No.: US 12,429,551 B2
(45) Date of Patent: Sep. 30, 2025

(54) SYSTEM AND METHOD FOR DETERMINING LOCATION DATA

(71) Applicant: NAVIGICOM LTD, Petach Tikva (IL)

(72) Inventor: Baruch Cyzs, Kiryat Motzkin (IL)

(73) Assignee: NAVIGICOM LTD, Petach Tikva (IL)

( * ) Notice: Subject to any disclaimer, the term of this patent is extended or adjusted under 35 U.S.C. 154(b) by 344 days.

(21) Appl. No.: 18/034,153

(22) PCT Filed: Oct. 28, 2021

(86) PCT No.: PCT/IL2021/051277
§ 371 (c)(1),
(2) Date: Apr. 27, 2023

(87) PCT Pub. No.: WO2022/091096
PCT Pub. Date: May 5, 2022

(65) Prior Publication Data
US 2023/0384413 A1    Nov. 30, 2023

(30) Foreign Application Priority Data
Oct. 29, 2020    (IL) .......................... 278386

(51) Int. Cl.
*G01S 5/10*    (2006.01)
*G01S 5/02*    (2010.01)

(52) U.S. Cl.
CPC .............. *G01S 5/10* (2013.01); *G01S 5/0226* (2013.01)

(58) Field of Classification Search
CPC ................................. G01S 5/10; G01S 5/0226
(Continued)

(56) References Cited

U.S. PATENT DOCUMENTS 5,748,146 A * 5/1998 Grove .................. H01Q 19/021
342/174
9,814,051 B1    11/2017 Shpak
(Continued)

FOREIGN PATENT DOCUMENTS

CN    103926573 A *    7/2014    ............... G01S 7/02
EP    2278352 A2    1/2011
(Continued)

OTHER PUBLICATIONS

PCT International Search Report for International Application No. PCT/IL2021/051277, mailed Dec. 27, 2021, 15pp.
(Continued)

*Primary Examiner* — Harry K Liu
(74) *Attorney, Agent, or Firm* — The Roy Gross Law Firm, LLC; Roy Gross

(57) ABSTRACT

A system and corresponding method for use in determining location of a mobile unit are described. The method comprises transmitting at least one beacon signal from an antenna array formed by an array of antenna elements located in a predetermined position and having predetermined boresight facing and receiving said at least one beacon signal by the mobile unit and using a processor for determining location of said mobile unit with respect to said predetermined position. The array of antenna elements comprises an arrangement of a plurality of antenna elements with predetermined arrangement configured such that each antenna element transmits signal portion having orthogonal signal portions with respect to other antenna elements of the array. Processing at the mobile unit utilizes variations in wireless channel states of signal portions received from the different antenna elements of the array for determining at least angular position of said mobile unit with respect to said boresight of said antenna array.

19 Claims, 6 Drawing Sheets

(58) Field of Classification Search
USPC .......................................................... 342/464
See application file for complete search history.

(56) References Cited

U.S. PATENT DOCUMENTS

| | | | |
|---|---|---|---|
| 10,361,766 B2* | 7/2019 | Antonik | H04B 7/0891 |
| 11,444,707 B2* | 9/2022 | Petersson | H01Q 3/267 |
| 2006/0050625 A1 | 3/2006 | Krasner | |
| 2017/0256855 A1* | 9/2017 | Robinson | H01Q 3/34 |
| 2019/0222959 A1* | 7/2019 | Duan | H04W 4/023 |

FOREIGN PATENT DOCUMENTS

| | | |
|---|---|---|
| EP | 3210040 A1 | 8/2017 |
| EP | 3360201 A1 | 8/2018 |
| EP | 3443617 A1 | 2/2019 |
| WO | WO-2022053848 A1 * | 3/2022 ........... H04B 7/0452 |

OTHER PUBLICATIONS

PCT Written Opinion for International Application No. PCT/IL2021/051277, mailed Dec. 27, 2021, 6pp.

PCT International Preliminary Report on Patentability for International Application No. PCT/IL2021/051277, issued May 2, 2023, 4pp.

* cited by examiner

SYSTEM AND METHOD FOR DETERMINING LOCATION DATA

CROSS REFERENCE TO RELATED APPLICATIONS

This application is a National Phase of PCT Patent Application No. PCT/IL2021/051277 having International filing date of Oct. 28, 2021, which claims the benefit of priority of Israeli Patent Application No. 278386, filed Oct. 29, 2020, the contents of which are all incorporated herein by reference in their entirety.

TECHNOLOGICAL FIELD

The present invention is in the field of determining location of one or more objects and specifically relates to GPS localization techniques.

BACKGROUND

Determining accurate location of moving objects enables improved operation in various applications. The use of Global Positioning System (GPS) or other satellite-based location systems provide highly accurate data on location of a receiving unit. In some applications, detecting satellite-based signals for location data may be limited due to environmental limitations or other interferences.

Conventional GPS-free location data is typically based on triangulation of signal transmitted from two or more different locations. In such configurations, the signal path time is determined for each location, and position of the receiving unit can be determined based on distance from the two or more transmission locations.

GENERAL DESCRIPTION

There is a need in the art for a novel technique and system enabling to determine location of a mobile unit, while not relaying on known satellite signals. The present technique enables a to determine location of a unit (e.g. mobile unit) in accordance with beacon signal transmitted by a ground/transmission station of a predetermined location. The present technique is capable for determining position of the mobile unit based on beacon signals transmitted from a single transmission station located in a predetermine position.

The present technique utilizes a transmission station comprising an antenna array formed by a plurality of antenna elements arranged in a predetermined arrangement (e.g., one-dimensional array, two-dimensional array, cylindrical array). The antenna array is configured to transmit beacon signals, the beacon signals are to be collected by at least one mobile unit and used for determining position of the mobile unit with respect to the predetermined location of the antenna array. Generally, the antenna array is positioned with a predetermined boresight facing, thus defining initial position and directions to remove ambiguity in determined position of the mobile units.

To this end, the antenna elements of the antenna array are configured to transmit orthogonal signal portions of the beacon signal, such that each antenna element transmits signal portions that are orthogonal to signal portions transmitted by other antenna elements. The mobile unit is configured for collecting the beacon signals and determining data about communication channels and corresponding complex value from the different transmitting antenna elements (also referred to as channel values). The complex amplitudes and phases provide data on estimated wireless channel values relating to path of the signal portions transmitted from the different transmitting antenna element arriving to the receiving antenna. Generally, the estimated wireless channel state values are associated with angle of departure of the signal with respect to boresight of the antenna array. The orthogonality of the signal portions enables the mobile unit to differentiate between signal portions transmitted by the different antenna elements, and thus determine complex estimated wireless channel state values for different transmitting antenna element and the receiving antenna separately. Thus, by estimating the complex wireless channel state values (amplitude and phase) through the signal portions, the mobile unit can determine its azimuth, and in in some embodiments also determine elevation, with respect to position of the boresight of the antenna array of the transmission station.

In some embodiments, the beacon signal may be transmitted periodically, within a selected transmission periodicity, e.g. signal transmitted in selected intervals between milliseconds and up to seconds (e.g. every 0.001 seconds to every 5 seconds). In some configurations, the beacon signal may be transmitted continuously. In some configurations, the beacon signal may be transmitted in response to signal request transmitted by the mobile unit or provided by an operator.

The beacon signal may typically be transmitted using orthogonal frequency division multiplexing (OFDM), code-division multiple access (CDMA), Time Domain Multiple Access (TDMA), Frequency division multiple access (FDMA) or any known multiple access technique enabling point to multipoint communication. Generally, for example, in some embodiments using OFDM, the OFDM technique defines one or more symbol durations determining separation between subcarriers. The transmission band thus includes multiple closely spaced subcarriers characterized by spacing between adjacent subcarriers being inverse of the OFDM symbol duration. This provides that the two adjacent subcarriers are orthogonal to each other within the OFDM symbol duration enabling separation of the subcarriers.

The subcarrier groups are orthogonal between them within a predefined symbol period, enabling receiving and detecting the subcarrier groups without mutual interference between them. The present technique utilizes transmission of different subsets of subcarrier groups from the different antenna elements. For example, each antenna element is operated to transmit in different subset of subcarrier group at the same time within OFDM symbol duration. More specifically, each antenna element of the antenna array transmits the beacon signal within one or more selected subcarriers associated with a common time OFDM symbol. While other subcarrier groups (through their modulation content) being orthogonal to the other transmitted subcarrier groups are muted (not transmitted) through the pertinent antenna element while active through the other antenna elements, where each antenna element transmits different subcarrier group and mute all other. Thus, each of the plurality of antenna elements transmitted the beacon signal within one or more different and orthogonal subcarrier groups with respect to those used by other antenna elements.

Thus, the present technique utilizes spatial and frequency orthogonality between signal portions transmitted by the different antenna elements, such that based on subcarrier group, each signal portion can be directly related to antenna element transmitting thereof. The mobile unit is generally pre-provided with data indication subcarrier groups used by the different antenna elements, and location of the respective antenna element within the antenna array of the transmission station.

Generally, the beacon signal may also comprise transmission time stamp. Upon collecting the beacon signal at the mobile unit, time difference between the transmission time stamp and time of collection of the signal is determined, thereby determining distance of the mobile unit from the predetermined location of the antenna array. To this end, the transmission station and mobile unit may comprise internal clocks, and the clocks are synchronized between them., enabling to determine distance of propagation of the beacon signal in accordance with time delay of arrival (ToA). The mobile unit may periodically determine time delay between the transmission timestamp and receiving recovered time of the beacon signal at the receiver antenna by the receiver processor to determine Time of Arrival ToA of the transmitted beacon signal. The time delay for signal propagation is indicative of distance between the antenna array of the transmission station and the mobile unit. For providing absolute propagation time the clocks of both the transmission stationary and mobile stations should be reset together with the mobile receive the transmitted timestamp at distance zero or at accurately known distance. The timestamp transmission can be replaced with known periodic OFDM frame where the start of frame is measured in distance zero for calibration and then continuously during the mobile flight.

In this connection, the clock synchronization may be performed periodically by determining time of double passage of signal between the transmission stations and the mobile unit which acts as repeating transponder with fix known delay. Typically, the clock synchronization may be performed at different instances, where the mobile unit may be at different locations with respect to the transmission station.

To this end the clock synchronization provides data on clock error between internal clock of the mobile unit and reference clock located at the transmission station. The clock synchronization may include determining a 2-way passage time for a synchronization signal as compared to time data at the mobile unit when receiving the synchronization signal. The clock synchronization process may typically consider certain fix and known electronic delay associated with time passing between receiving of the synchronization signal by the mobile unit and transmitting a corresponding synchronization response signal. The electronic delay is typically fixed for each electronic system and can be measured as calibration process. Additionally, data on the electronic delay time may be kept in memory of at least one of the transmission station and mobile unit for use in further synchronization sessions.

Some embodiments of the present technique relate to solving issues associated with measuring, at the mobile unit, time delay between the transmission timestamp and the time of receiving the transmission timestamp at the mobile unit receiver. The measured time delay typically includes time delay associated with actual propagation time of the beacon signal between the transmission antenna to the receiving antenna and time variation associated with drift and wonder produced between clocks of the transmission station and that of the mobile unit. To this end, the present technique may utilize periodic synchronization process, including clock synchronization between the transmission station and the mobile units. Synchronization is generally required to determine ToA accurately to identify distance between the transmission station and the mobile unit.

Thus, according to a broad aspect, the present invention provides a method for use in determining location of a mobile unit, the method comprising:

transmitting at least one beacon signal from an antenna array formed by an array of antenna elements located in a predetermined position and having predetermined boresight facing, said array of antenna elements comprise an arrangement of a plurality of antenna elements with predetermined arrangement, wherein said antenna element being configured such that each antenna element transmits signal portion having orthogonal signal portions with respect to other antenna elements of the array;

receiving said at least one beacon signal by the mobile unit and using a processor for determining location of said mobile unit with respect to said predetermined position, said processing utilizes variations in wireless channel states of signal portions received from the different antenna elements of the array for determining at least angular position of said mobile unit with respect to said boresight of said antenna array.

According to some embodiments, the variations in wireless channel states being indicative of at least one of phase and amplitude signal portions enabling to determine angular position of the mobile unit.

According to some embodiments, the at least one beacon signal comprises at least transmission timestamp, said processing comprising determining time difference between said transmission timestamp and time of reception of said at least one beacon signals and using said time difference for determining data on distance of said mobile unit from said predetermined position of said antenna array.

According to some embodiments, said determining time difference comprises determining frame start between said transmission timestamp and time of reception comprises determining recovered timing based of known signal portions received from the antenna elements.

According to some embodiments, the method may comprise periodically transmitting said at least one beacon signal using fix duration frames that the transmitted start of frame is known to the mobile receiver during pre-launching period, determining initial start of frame received time by said mobile unit, and using in the difference between the transmitted and received start of frame for determining time of flight of the beacon signal.

According to some embodiments, the antenna array comprises a selected number of N antenna elements, and wherein each antenna element j of said array is operated for transmitting a respective portion of said beacon signal being orthogonal to other portions of the beacon signal transmitted by other antenna elements.

According to some embodiments, said transmitting at least one beacon signal from an antenna array comprises transmitting said beacon signal using at least one of: orthogonal frequency division multiplexing (OFDM), code-division multiple access (CDMA) Time Domain Multiple Access (TDMA) and Frequency division multiple access (FDMA).

According to some embodiments, the different antenna element of said antenna elements of the antenna array transmit orthogonal signal portions between them.

According to some embodiments, each antenna element j of the antenna array is operated for transmitting signal portion using OFDM technique in one or more subcarrier frequencies selected from j, N+j, 2N+j . . . , thereby providing orthogonal subcarriers between the antenna elements.

According to some embodiments, the method comprises repeatedly transmitting beacon signals at a preselected transmission rate, thereby enabling to periodically determine location of said mobile unit.

According to some embodiments, the antenna array is a two-dimensional array, said processing utilizes at least one of phase and amplitude variations between received signal portions for determining azimuth and elevation angle with respect to said boresight of said antenna array.

According to some embodiments, the antenna array has rectangular or cross shaped arrangement of the antenna elements.

According to some embodiments, the antenna array has cylindrical arrangement of the antenna elements.

According to some embodiments, the method further comprises performing continuous wireless channel state estimation between the mobile unit and the antenna elements of the antenna array, thereby enabling to determine variations between received signal portions.

According to yet another broad aspect, the present invention provides a receiver system for use in determining position, the system comprises an antenna element, and at least one processor; said antenna element is configured for collecting beacon signals transmitted from a transmitting station having predetermined location and antenna boresight heading, the beacon signal is formed of a plurality of signal portions having orthogonal subcarrier groups transmitted from corresponding plurality of antenna elements arranged of said antenna array;
said at least one processor is configured and operable to process the received beacon signal and determine data on variations in wireless channel states of signal portions received between said plurality of signal portions, to thereby determine angular position of said receiver system with respect to location and heading of said transmitting station.

According to some embodiments, the receiver system may further comprise a memory utility comprising pre-provided data indicative of signal portion transmitted from different antenna elements, said at least one processor is configured and operable to utilize said pre-provided data and periodically determine wireless channel states transmitted from the different antenna elements.

According to some embodiments, the at least one processor is further configured and operable to determine amplitude and/or phase variations between said plurality of signal portions, to thereby determine said angular position of the receive with respect to location and heading of said transmission station.

According to some embodiments, the at least one processor is further configured for extracting transmission timestamp from said received beacon signal and for determining time difference between transmission time indicated in said timestamp and time of reception of said beacon signal, and for determining therefrom data indicative of distance of said receiver unit with respect to aid predetermined location of said transmission station.

According to some embodiments, the receiver system may be configured for estimating and determining start of frame time measurement of said at least one beacon signal and predetermined data on fix duration frames used for periodic transmission of said beacon signal, and for determining initial start of frame by said mobile unit at known distance, and using periodic start of frame timing measurement variation compared to the initial start of frame in further beacon signals for determining time of flight of the beacon signal.

According to some embodiments, the receiver system may further comprise at least one internal clock, wherein said receiver system is configured for periodically synchronizing said at least one clock in accordance with local time of said transmitting setation.

According to some embodiments, the receiver system may further comprise a time synchronization module configured and operable for bidirectional synchronization with said transmission station, said bidirectional synchronization comprises determining a timestamp error in accordance with double transmission path of synchronization signal between said receiver unit and said transmission station.

According to yet further broad aspect, the present invention provides a transmission station for use in determining position of one or more receiver systems, the transmission station comprises an antenna array comprising a plurality of antenna elements, said antenna array is configured to periodically transmit beacon signals, wherein each of said antenna elements transmits signal portions orthogonal to signal portions transmitted by other antenna element.

According to some embodiments, the beacon signals comprise transmission timestamp data indicative of time of transmission of said beacon signals.

According to some embodiments, the transmission station is configured and operable for periodically transmitting said beacon signals using fixed duration frames, thereby enabling one or more mobile receiver to determine time of flight of the beacon signal using said frame duration.

According to some embodiments, the antenna array is configured to periodically transmit said beacon signals using at least one of: orthogonal frequency division multiplexing (OFDM), code-division multiple access (CDMA) Time Domain Multiple Access (TDMA) and Frequency division multiple access (FDMA), thereby enabling transmission of signal portions having orthogonal subcarriers between antenna elements of the antenna array.

According to some embodiments, the transmission station is further configured to periodically transmit time synchronization signal, said transmission station further comprising at least one receiving antenna element configured for receiving bidirectional time synchronization signals form said at least one receiver system and for determining timestamp error in accordance with double transmission path of synchronization signal between said receiver system and said transmission station, and to transmit synchronization data indicative of said timestamp error to said receiver system.

According to some embodiments, the signal portions comprise one or more subcarrier groups being orthogonal between signal portions transmitted by different antenna elements.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Figure 1A:
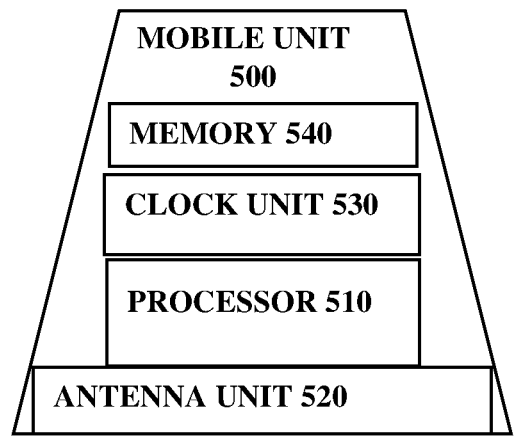
FIGS. 1A and 1B illustrate schematically a mobile unit and transmission station according to some embodiments of the present invention.
Figure 1B:
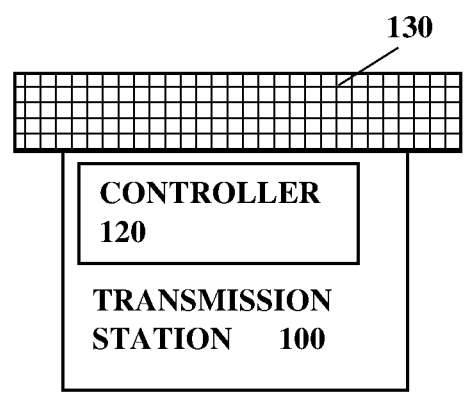

The present technique provides for determining position of one or more mobile objects in response to positioning beacon signal provided from the transmission stations. According to the present technique, one or more mobile units, generally allowed to move within a selected region, are configured for receiving beacon signals transmitted from a single transmission station, and determine accordingly location of the mobile units with respect to the transmission station. Generally, given stored data on geographical location of the transmission station, this location data may be translated to global location data of the mobile unit. The pre-stored signal may also include transmission calibration data indicative of characteristics of the transmission antenna located within the transmission station. The transmission calibration data may be used to reduce determining errors angle of departure (AoD) that may occur due to non ideal in practical antenna parameters. In this connection reference is made to FIGS. 1A and 1B illustrating respectively schematic configurations of mobile unit 500 and transmission station 100 according to some embodiments of the present invention.

The mobile unit 500 shown in FIG. 1 includes at least one processor 510 and an antenna unit 520 and is configured to be moving within a selected region. In some embodiments, the mobile unit 500 may also include an internal clock 530 and/or memory unit 540 pre-stored with selected data pieces as described in more detail below. To mobile unit 500 may be self-propelled, or moving by an external force, and may or may not include means for varying its trajectory. For example, the mobile unit may be moving using wheels, wings, rotors, or following a ballistic path. To this end the mobile unit 500 may include suitable elements such as motor, propeller, wheels, path adjustment elements, or any other elements used for performing the functionality of the mobile unit 500.

The mobile unit 500 is operable for collecting beacon signals transmitted from the transmission station 100 and for processing the beacon signals to determine data about location of the mobile unit 500 with respect to the transmission station 100. To this end, the antenna unit 520 of the mobile unit 500 is configured to collect RF signals of one or more selected frequency ranges, and to transmit collected signal data to the processor 510 for processing and determining location data. Generally, the antenna unit 520 is configured for receiving communication in selected one or more coding protocols, such as CDMA, OFDM, TDMA or any other multiple access technique used by point to multipoint wireless communication. or other communication protocols and includes suitable one or more demultiplexers and/or one or more demodulator for extracting signal data portions from the received beacon signals. Generally, the antenna unit 520 is operable for receiving signal portions transmitted by the antenna elements of the transmission station and providing data on the collected signal within different signal portion for processing. The signal portions are typically transmitted within different frequency sub-bands of FDMA transmission, different time slot of TDMA transmission, modulated by different orthogonal coding of CDMA transmission or transmission of different sub-carrier groups of OFDM transmission. The antenna unit 520 is further configured to provide data on the received signal to the processor 510. The processor 510 is configured and operable to separate signal portions and determine the amplitude and phase of the wireless channel state variations between signal portions.

The antenna unit 520 may also include a transmitting circuit, enabling bi-directional communication with the transmission station, e.g. for clock synchronization purposes. The processor 510 is configured to process the received beacon signal portions and for determining data on location of the mobile unit 500 in accordance with the signal portions transmitted by the different antenna elements of the antenna array of the transmission station. It should be noted that generally the transmission station is equipped with communication circuitry and transmission and reception antennas as described further below.

The processor 510 is configured to process received data on the collected signal portions, extract orthogonal signal portions having and determine data on time/phase variations between signal portions. This enables the processor 510 to determine data on angular location of the mobile unit 500 with respect to position of the transmission station antenna boresight angle 100. To this end, the processor 510 utilizes data of amplitude and time/phase shift of the signal portions after separating them each, to determine data on azimuth and elevation AoD orientation of the mobile unit 500 with respect to the ground station antenna boresight. The AoD is determined as a virtual line of sight line between the transmission station antenna array and receiving antenna of the mobile unit with respect to the transmission antenna boresight. As indicated above, data on the different orthogonal method in transmission of the signal portions is generally pre-stored at the mobile unit 500 with data on the respective antenna elements of the transmission station. The variations in amplitude and phase between the signal portions wireless channel state are indicative of variations in propagation path from the respective antenna elements toward the antenna 520 of the mobile unit 500. Wireless channel state of each signal portion is estimated by the received signal portion amplitude and phase and the stored known data in memory 540 about what was transmitted in the antenna element related to this signal portion. More specifically, the processing may utilize pre-store data, stored in the memory 540, indicative of relation between signal portions and arrangement of the antenna elements of the transmission station 100. The processor 510 may thus utilize the pre-stored data that holds calibration data of the transmission antenna and TF circuit imperfection that may impact the estimate complex wireless channel state vector from all transmission antenna element to the receiving antenna for determining angular relation between location of the mobile unit 500 in respect of the boresight direction of the transmission station 100.

In some configurations, the mobile unit 500 may generally include a clock unit 530, typically synchronized with internal clock of the transmission station 100. The clock unit 530 may be used for determining time difference between time of transmission of the beacon signal, and time of reception of the signal at the mobile unit. Determining the time difference between signal transmission and reception provides data indicative of distance between the transmission station and mobile unit, in accordance with propagation speed of the beacon signal (e.g. speed of light). Generally, time of transmission of the beacon signal may be included as data within the signal, e.g. within preamble of the signal or through frame structure where the start of frame timing can be recovered. Further to implement the time of arrival ToA measurement at the mobile unit 500, the system may need to enable data link between the transmission station 100 and the mobile unit 500 to enable the mobile unit 500 to read the transmitted timestamp in some embodiments. This may be implements with any signal waveform technique and specifically using OFDM, CDMA or other communication technique, using proprietary communication link or using existing standard such an LTE transmission.

In some configurations, timestamp transmission within the beacon signals may be aligned with selected one or more reset points commonly used by the transmission station 100 and the mobile unit 500. Alignment of the timestamp may be performed when the mobile unit 500 is in known distance of the transmission station 100 or at minimal distance or zero distance, when the mobile unit is in pre-launch state, or at other pre-known distance. For example, to align the internal clocks, each frame may carry inside frame serial number. Further, in some embodiments the transmissions station 100 and mobile unit 500 may utilize pulse per second (1PPS) generator (e.g. associated with global navigation system unit). This 1PPS generator may be used to compensate for drift between the clock of the mobile unit 500 with respect to that of the transmission station 100. Generally, if the drift becomes too large, leading to mismatch during long operating time duration of the air station, the 1PPS input may be used.

In some embodiment when the launching time is sufficiently short with respect to drift/wonder between the transmission station 100 and mobile unit 500 clocks does not to gain significantly lag time that might be translated to sufficiently low ToA measurement that will meet the required accuracy of the range measurement. In such embodiment both clocks may be selected according to their drift and wonder parameter and their timing stability and accuracy according the maximum launching time, and thus no additional synchronization of clocks will be required.

Further, in some embodiments system may employ periodic synchronization process. To this end, after receiving a beacon signal with transmitted timestamp, the mobile unit 500 may periodically transmit a dedicated timestamp signal for synchronization based on the clock unit 530 thereof to the transmission station 100 receiving the transmission timestamp with certain known delay. In such configurations, the transmission station 100 may receive the timestamp signal and process data on the clock unit 530 timestamp, and the roundtrip propagation delay between the transmission and receiving timestamp, to determine lags in clock synchronization and drift/wonder of the clock unit 530. The lag is generally determined by determining the received timestamp error in reference to transmitted timestamp and the time for the measured roundtrip propagation. Accordingly, the transmission station may thus transmit synchronization signal when needed. The mobile unit 500 may thus receive data on timestamp error from the transmission station and adjust the clock unit 540 to be synchronized with the transmissions of clock reading from the transmission station 100.

The mobile unit 500 may be configured to response to synchronization signals for synchronizing the clock unit 530 in accordance with internal clock of the transmission station. Typically, the synchronization sequence may include receiving a synchronization signal, registering time of reception based on the clock unit 530, transmitting a return synchronization signal including local time of reception, and time of transmitting the return synchronization signals. Registering the time of reception of synchronization signals and time of transmission of the return synchronization signal provides compensation of associated processing and electronic transmission time that is generally internal to the electrical circuits of the mobile unit 500 and typically known to the ground station processor and does not relate to path of the synchronization signal. The electronic delay time may be known and pre stored for use by the transmission station 100 in synchronization processing.

Determining angular position with respect to boresight direction of antenna of the transmission station 100, and distance from the antenna, provides data on position of the mobile unit using spherical coordinates $(r,\theta)$ or $(r,\theta,\varphi)$. Given predetermined data on position of the transmission station and boresight heading thereof enables determining global position of the mobile unit 500.

FIG. 1B exemplifies a schematic configuration of the transmission station 100. The transmission station 100 includes a controller 120 unit and an antenna unit 130 and is configured to periodically transmit beacon signals toward a region of interest, to thereby enable determining position of one or more mobile units. It should generally be noted that the effective position of the transmission station 100 is determined by position of the antenna unit 130 thereof, and specifically based on position of the radiating elements of the antenna unit 130. The antenna unit 130 includes an array of antenna elements arranged with a predetermined boresight at a selected location, defining predetermined origin for determining position according to the present technique. The antenna unit 130 is operated for transmitting the beacon signals such that each antenna element transmits signal portion that is distinguishable between signal portions transmitted by other antenna elements. More specifically according to some embodiments, the antenna elements are configured to transmit OFDM symbol using different subcarrier groups for each antenna element, thus the different antenna elements transmit generally OFDM orthogonal subcarriers. The signal portions may thus be transmitted concurrently with mutual antenna element by having orthogonal coding on the modulation of the subcarriers through the OFDM symbol duration. with respect to subcarrier groups of other antenna elements of the antenna unit 130. Typically, the antenna elements of the antenna unit 130 are separated between them by a distance of at least half wavelength of the band used for transmitting the beacon signals to avoid, or at least minimize, AoD ambiguity due to generated grating lobes with higher spacing a known phenomenon to skilled in the art.

The controller 120 is configured and operable for operating the antenna unit 130 for transmitting the beacon signals. The controller 120 provides operational commands relating to order and arrangement of the signal waveform transmitted by the different antenna elements. For example, as indicated above, the signal waveform may be associated with different OFDM symbol transmitted by each of the antenna elements. Generally, the arrangement of signal waveform (such as the sub-carriers in each transmitted OFDM symbol through each antenna elements is predetermined in accordance with selected operation scheme and may be pre-stored in the respective one or more mobile units 500. This arrangement may be further transmitted in selected periodic update for real time AoD measurement update.

Determining proper location of the mobile units 500 requires pre-provided information on arrangement of the signal waveform, or subcarriers of OFDM symbols, transmitted through each antenna element and their arrangement along antenna elements of the antenna unit 130.

Generally, the beacon signals include data indicative of transmission station identity and time of transmission. The beacon signal may also include additional data in accordance with general operation of the system.

To maintain synchronization between the one or more mobile units 500 and the transmission station, the transmission station may initiate clock synchronization sessions with the one or more mobile units 500. Generally, the controller 120 may initiate, at selected time intervals determined in accordance with drift level of the clock associated with the mobile unit 500, synchronization sessions. To this end the controller 120 may transmit, using the antenna unit, a time synchronization signal directed to the one or more mobile units 500. As indicated above, the mobile unit 500 may be configured to respond to time synchronization signal by transmitting a return time synchronization signal including data on time of reception as registered by the local clock unit (530). In some configurations, the return signal may also include data on time of transmission thereof, thereby considering electronic delay time in synchronization process. Thus, the controller 120 can determine the delay time associates with signal path between the transmission station 100 to the mobile unit 500 and back, and separate the signal path (preferably known) delay from delay associated with reception and electronic processing of the synchronization signal by the mobile unit 500. Thus, the controller 120 can determine the time of passage of the synchronization signal and transmit synchronization correction signal to the mobile unit 500. The controller 120 may also operate to compare timestamp readings at the reception instant and transmitted timestamp received from the mobile unit 500 as well as the propagation delay from the mobile unit 500 antenna to the ground antenna. Typically, the propagation delay is half of the measured roundtrip delay. The difference between both timestamp value may indicate a timestamp error, typically associated with drift or wonder in the clock 530 of the mobile unit 500. Data indicative of the timestamp error, and timing clock correction thereof is transmitted back to the mobile as synchronization correction. The synchronization correction signal generally indicates the mobile unit 500 to correct its own clock 530 time reading through the time error provided by the transmission station, thus indicating the correct clock 530 at the mobile unit 500.

Figure 2:
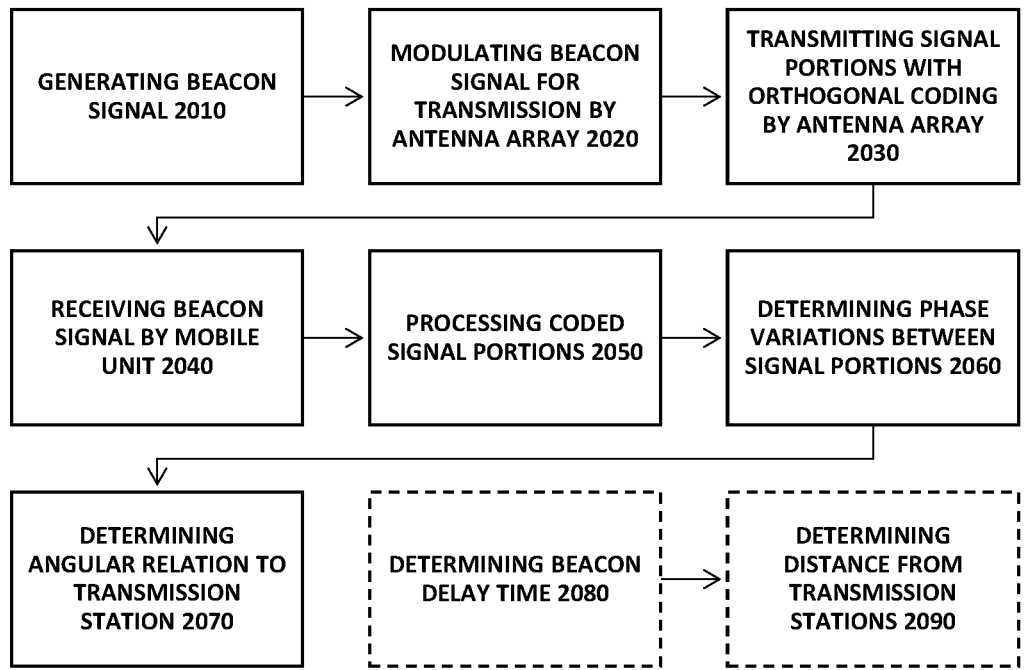
FIG. 2 shows a method of determining location of a mobile unit according to some embodiments of the present invention.

In this connection, reference is made to FIG. 2, exemplifying a technique for determining location of a mobile object/unit according to some embodiments of the present invention. As shown, the technique includes generation of a beacon signal 2010. The beacon signal generally includes mobile identity for synchronization process and timestamp data and may include additional data as the case may be. The beacon signal may be encrypted to allow only authorized mobile units to utilize the beacon for location data. The beacon signal is modulated and get dedicate waveform for transmission by an antenna array 2020. Generally, the signal is modulated and get dedicate waveform in any one of signal modulation technique that enable multiple communication signals within common signal band. For example, the signal may be modulated and waveformed to be transmitted by CDMA, OFDM, TDMA or other suitable techniques. The signal is transmitted by the antenna array 2030, such that each antenna element of the array transmits a subset of the beacon signal in a manner that each subset is orthogonal to the subset that is transmitted by other elements. Such signal subsets may be transmitted in different time, frequency or modulated with orthogonal coding. This enables a mobile unit collecting the signal to differentiate between signal copies transmitted by different antenna elements and utilize this differentiation for determining location.

The beacon signal is typically collected 2040 by one or more mobile units (500) moving within a field/region. A mobile unit collecting the beacon signal utilizes the collected signal and processes it for determining signal subsets transmitted from the different antenna elements. The mobile unit operated to process the signal portions/subsets waveform 2050 to determine complex values indicative of phase and amplitude variations between signal subsets 2060 wireless channel states. The mobile unit 500 generally utilizes predetermined data on waveform, arrangement of the antenna elements and signal subsets transmitted by each antenna element for processing the collected beacon signals. The processing enables to estimate separate wireless channel states from each antenna element to the antenna 520 of the mobile unit. The wireless channel states vary with respect to complex values indicative of phase and amplitude variations between signal portions. Using the complex values between signal portions for the estimated channel state, the processing includes determining variations between the signal portions/subsets estimated wireless channel state of all the transmitting antenna elements. In accordance with amplitude and phase variations of the estimated wireless channel state, the mobile unit 500 determines the angle of departure (AoD) with reference to the boresight of the transmitting antenna 2070. The AoD may be determined in one or two axes including e.g. azimuth and elevation angle. Generally, the AoD may be determined using direction finding algorithms such as interferometric, beam forming and sub-space techniques such as MUSIC and ESPRIT. The AoD may be determined using the principles of wavefront reconstruction, and phased array, the processing enables to determine angular relation between location of the mobile unit and the transmission station (or at least its antenna unit) 2070. The angular relation data may be associated with dimensionality and shape of the antenna array transmitting the signal. For example, transmission station utilizing one-dimensional array of antenna units enables to determine angular relation $\theta$ within a plane, i.e. azimuth. In some embodiments, the transmission station may utilize antenna unit having a two-dimensional array of antenna units, this enables the mobile unit to determine its angular location within spherical coordinates $\theta$ and $\varphi$, i.e. azimuth and elevation.

It should be noted that generally, determining AoD may include various errors. Such errors may be associated with imperfection of the transmission antenna, RF circuits or other noise factors. The transmission antenna and RSD circuits related errors may generally include known factors such as mutual antenna element coupling, center phase shift due to AoD, phase and amplitude variation transmission factor for each antenna element and variation among elements. In order to lower the AoD error, the transmission station may undergo factory calibration directed at the attached RF transmitters (antenna elements). The calibration data may include transmission radiation pattern from each antenna element. Such calibration data may be extracted and pre-stored as data file associated with each transmission station 100. Such calibration data file may be provided and pre-stored in the mobile unit 500 memory 540 prior its launching. The calibration can be done in different calibrated environmental temperature to compensate dependency of the antenna imperfection to environmental and/or temperature variation. The mobile unit processor may use the calibration data to compensate the measured AoD with the stored calibration data of the transmission antenna.

As indicated above, in some embodiments, the technique may also include determining data on distance between the mobile unit and the transmission station. To this end the technique further include determining beacon signal delay time 2080 and using the delay time for determining distance between the transmission station and the mobile unit 2090. Generally, to measure the propagation time of arrival (ToA), the mobile unit 500 also determines timing of the received signal values by performing timing recovery scheme. This timing recovery estimation can be done by several techniques and is generally based on known data waveform within the beacon signal. In some configurations, the received signal may be cross correlated with a synthetic signal copy prestored at the mobile unit 500 to implement an early-late correlation and determine the exact timing value. With OFDM signal the timing can be estimated by evaluating the linear phase value across the received subcarriers.

The determined AoD and ToA may be significantly affected by multipath and scattering of the beacon signal along its propagation path. The present technique may utilize wideband beacon signal enabling mitigation of the multipath error. with the use of wideband beacon signal enables filtering out of the multipath contribution. When utilizing OFDM implementation for example, the channel state estimation may be determined across the frequency band using many subcarriers. in such configurations, the processing may utilize inverse Fourier Transform of the frequency domain channel state estimation to extract the channel impulse response from each antenna element to the receiving Antenna. If the beacon signal is wide enough, unwanted multipath reflections may be filtered out from the channel impulse response. It should be noted that in various DF subspace techniques, such as MUltiple SIgnal Classification (MUSIC), the multiple subcarriers can add dimension to the correlation matrix and through that to be able to extract multiple scatterer and from them to draw only the direct line of site (LoS) component.

As also indicated above, this technique may generally include periodic synchronization of clocks between the transmission station and the mobile unit. Further, this distance r between the mobile unit and the transmission station completes the location information within two- or three-dimensions, i.e. (r, θ) or (r, θ, φ). Providing predetermined data on geographical position of the transmissions station, and boresight heading of the antenna unit thereof, enables to utilize this location information for complete geographical location of the mobile unit.

Thus, as indicated above, the present technique provides a Localization Information by Single Beacon (also referred herein as LISBON). The system if formed of a stationary transmission station 100 and one or more flying/moving units 500. The LISBON system operates for determining location data of the units 500 utilization of beacon transmitter and array antenna that are located at the ground station. The present technique thus utilizes the transmission station as a single anchor for determining location of the one or more mobile units. The system may operate one or more additional transmission stations providing redundant coverage, or for increasing coverage area. However, according to the present technique, the beacon transmission of the transmission station is sufficient for determining location data by itself, and additional transmission stations, if used, may operate independently to each other.

As indicated above, the transmission station provides transmission location beacon signals. The transmission station includes an antenna unit including an antenna array having a plurality of antenna elements (radiating elements). The array may be a one-dimensional array, and it may preferably be two-dimensional array. In some embodiments, the array may have cylindrical form, or a form of a portion of a cylinder. Typically, the shape of the antenna array determines coverage field. Dimensionality of the antenna array is associated with dimensionality of angular relation of location data, i.e. one-dimensional array enables determining angular position in one dimension and two-dimensional array enables determining angular position in two-dimensions.

The beacon signal is received by antenna of the mobile unit and receiving circuitry thereof. The mobile unit processes the received signal and utilizes the beacon signal data for determining location thereof with respect to the transmission station. To this end, the mobile unit 500 includes prestored data on beacon signal format and encoding pattern of the antenna elements and may also include calibration data indicative of the transmission parameters of the antenna elements.

Generally, according to some embodiments, processing and determining the location data may be performed by the mobile unit. The processing may be done continuously or periodically and is generally performed in response to receiving beacon signals. The location data may be used for navigation tracker (e.g. using extended Kalman filtering (EKF) algorithms for navigation) to provide continues location data. The mobile unit 500 may transmit the determined location data, or pre-processed data on the collected beacon signal back to the transmission station, to enable the transmission station to determine location of the mobile unit.

Figure 3:
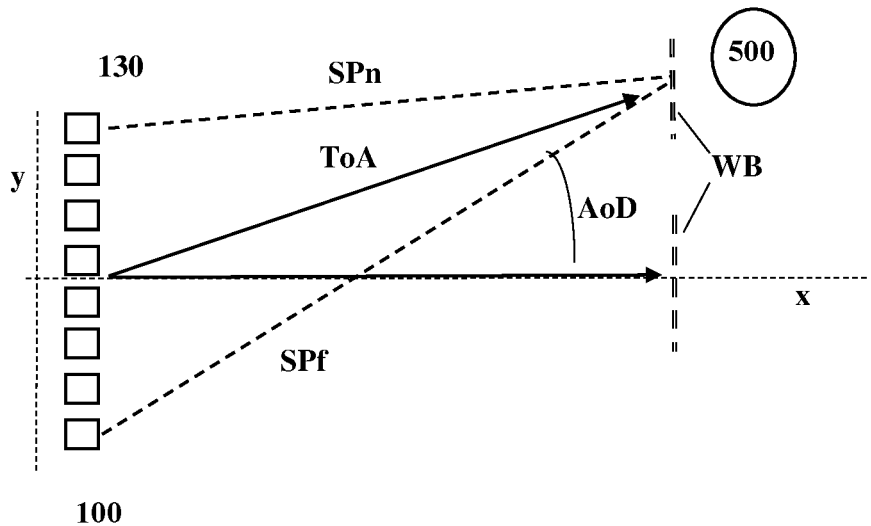
FIG. 3 exemplifies some aspects of operation of the present technique.

Reference to FIG. 3, exemplifying determining location data according to some embodiments of the technique. As shown, antenna unit 130 of the transmission station 100 transmits beacon signal. The beacon signal propagates in the field forming signal wavefront WB. In this example, the transmission station 100 is positioned with boresight directed along x axis, also, this example illustrates a one-dimensional antenna array.

The mobile unit 500 receives the beacon signal and operates to process the signal positions having different encodings. As exemplified in FIG. 3, signal portion transmitted by nearest antenna element propagates through path SPn, while signal portion transmitted by the farthest antenna element propagates through path SPf. This causes amplitude and phase variations between the wireless channel states that refer to the signal portions, corresponding to the paths difference. Thus, in accordance with phase and amplitude variations between the signal portions estimated wireless channel state, the mobile unit determines angular position AoD. For example, the mobile unit 500 may utilize interferometric DF algorithm or other DF algorithms. Various such DF technique may also utilize both amplitude and phase of the estimated wireless channel state based on predetermined data on each antenna element amplitude phase radiation pattern. with respect to boresight. As also indicated above, the mobile unit may operate to determine time of arrival ToA based by performing timing recovery estimation of the beacon signal to determine distance between the transmissions station and the mobile unit.

As indicated above, shape and arrangement of the antenna unit 130 is associated with coverage area of the system, and dimensionality of the location data. More specifically, linear one-dimensional antenna array provides coverage field of about 180 degrees with only azimuthal location data (horizontal 1D and distance). Rectangular or cross two-dimensional antenna array provides 180 degrees coverage field with both horizontal and elevation 2D location data. Cylindrical antenna array provides coverage within 360 degrees field with horizontal 1D localization. Cylindrical antenna array provides coverage of 360 degrees field with both horizontal and elevation 2D localization.

To determine distance between the mobile unit and transmission station, the technique may further include concurrent measurement of the exact time that it takes to signal to pass from the transmission station antenna to the mobile unit antenna (i.e. time of arrival ToA). The time of arrival is straightforwardly converted to distance or range by multiplying the time of arrival with the speed of light.

Upon determining data on angular position and distance of the mobile unit 500 from the transmissions station, geographical location of the mobile unit may be determined. This is generally based on transformation of coordinates and the use of predetermined data on geographical location of the transmission station. More specifically, given that ($x_g$, $y_g$, $z_g$) are the coordinates of the ground station and $x_a$ and $y_a$ and $z_g$ are the coordinates of the mobile unit, upon determining (r, $\theta$, $\varphi$) as relative position of the mobile unit with respect to the transmission station, geographical position of the mobile unit can be represented as $x_a = x_g + r^* \sin(\theta)\sin(\varphi)$, $y_a = y_g \pm r^* \sin(\theta)\cos(\varphi)$ and $z_a = r^* \cos(\theta)$.

Generally, determining the angle of departure AoD according to some embodiments of the present technique, and utilize a plurality of N concurrent different and separable signal transmissions through a plurality of N antenna elements within the antenna array of the transmission station 100. As indicated, each antenna element transmits a signal with different and orthogonal through frequency, time or coding enabling the mobile unit processor 510 to separate the signals and process phase and time relations between signal portions transmitted by the different antenna elements. The processor 510 can thus determine angle of departure with respect to boresight of the antenna unit 130. The element spacing of the antenna array should be less or equal half transmission signal wavelength in order to avoid grating lobe ambiguity in processing that can cause false AoD data.

As indicated above, the present technique utilizes transmission of beacon signal in the form of a plurality of N signal portions or copies, having orthogonal coding between them. Each signal portion is transmitted from one radiating element (antenna element) being a part of the antenna array 130. The N signal portions are transmitted concurrently through the N antenna elements to provides predetermined complex wireless channel state through initial phase variations between them and through amplitude variation according to each antenna element radiation pattern. The orthogonality coding of the signal portions is selected to enable the mobile unit to distinguish between the signal portions, i.e. the signal portions are back separable in the receiver of the mobile unit 500. It should be noted that to identify complex wireless channel state-phase and amplitude variations, the signal portions are generally within similar frequency range, however as separation between the signal portions is required, the use of orthogonality in frequency, time and coding allows the N transmitted signal copies to occupy the same spectrum bandwidth.

The signal portions may be orthogonal in various method. As indicated above, the beacon signal may be transmitted using spread spectrum or CDMA with complete orthogonal code such that all N signal copies will be orthogonal to each other in a known time interval. Additionally technique utilize transmitting signal portions from the N antenna elements using an OFDM signal waveform where in each antenna the active subcarriers are diluted by an order of N. this provides that for every N subcarrier there is one active in each antenna elements (and the other are with power off zero). For example, the first antenna element may have active subcarriers in subcarrier no 1, N+1,2N+1,3N+1 . . . , the $2^{nd}$ antenna element has active subcarriers in subcarrier no 2, N+2,2N+2,3N+2 . . . , the 3rd antenna element has active subcarriers in subcarrier no 3, N+3,2N+3,3N+3 . . . and the M antenna element has active subcarriers in subcarrier no M, N+M,2N+M,3N+M . . . etc. Thus, for each subcarrier group, only a single antenna element transmits within the subcarrier group, allowing the mobile unit to distinguish between the antenna elements.

For example, the transmission content may be of the form of MIMO LTE (multiple input multiple output LTE) downlink signal in arrangement of the reference symbols (pilot sub carriers). Some embodiments of the present technique may use a modified transmission signal of downlink LTE and to adopt it to the required Doppler and delay spread of the air station maneuvering scenario. The pilots sub carriers may be inserted in all symbols or in part pf the symbols such that the symbols without the pilots can be used for timestamp transmission or any other messages. In some examples, the signal is formed by even symbols containing data pieces and odd symbols containing pilot subcarrier data pieces.

Upon receiving the beacon signal, the mobile unit processes the signal for determining the AoD. the processor 510 may include a digital signal processor DSP, e.g. operating with standard angle or arrival (AoA) direction finding (DF) technique exploiting the reciprocity existence. The processing is generally inverse to transmission direction as performed by phased array antenna systems.

In some embodiments, to improve accuracy of the processing for determining angular position, the antenna unit of the transmission station may be calibrated either in an antenna range or in the field to extract radiation pattern, antenna manifold, element decoupling, phase center shifts versus angle of destination, effect of ground plain and metallic scatters in the antenna vicinity etc. The calibration data may be pre-stored at the mobile unit 500 and/or be updated from time to time.

In some embodiments, the operation of the mobile unit 500 for determining angular position may include the following tasks:

Acquiring the received signal transmitted by the transmission station.

Determining the channel state vector to the received antenna from each transmission element of the transmission antenna array at the transmission station. This may utilize the embedded pilots or the CDMA code of each transmitting antenna.

Filtering out multipath residuals from channel state elements to leave line of sight ingredients.

determining the AoD from the acquired channel state spatial domain vector. For example, using commonly known DF algorithms. This may include:
  determining relative phase and amplitude of each of channel state of the signal and compensating with the pre-calibrated data base to enhance the accuracy.
Applying interferometric algorithm.
Applying beam former algorithm.
Applying Multiple Signal Classification (MUSIC) algorithm on compensated signal copy.

Using estimation of signal parameters via rotational invariant (ESPRIT) technique on compensated signal copy.
Or
Using any other known algorithm of directional finding based on signal copies from predetermined sources.

Thus, the mobile unit 500 can determine angular position within one or two dimensions with respect to boresight of the transmission station. Further, as indicated above, the mobile unit may operate for determining range/distance from the transmissions station. The range finding process is based on timing clocks of both the transmission station and the mobile unit and synchronization between them. Generally, the clocks may be reset on the ground prior the launching of the mobile unit 500 to the same timestamp and that the drift or wonder difference of both clocks after the launching may be sufficiently low to allow determining range by time of arrival technique. When the drift between the clocks is sufficiently low, this may enable range detection for a certain period within a redetermine maximum allowed localization error.

The present technique may utilize various techniques for determining range using low clock drift to determine the time of arrival between the transmission station and the mobile unit. For example, timestamp of the ground station clock may be copied to clock of the mobile units when on the ground. This may be done periodically through wire or local wireless channel with compensation for the delay that introduce between the links. This periodic copy guarantees fresh alignments of the mobile units' clock with that of the transmission station. This may be done periodically for all mobile units used, or for each mobile unit when located at a corresponding dedicated calibration spot.

Alternatively, or additionally, the current timestamp may be written as added data to transmitted beacon and/or synchronization signals. In this configuration, the timestamp may require offset transmitted based on signal timeframe. The frame serial number may also be added at each frame signal providing the frame structure aligned to copied timestamp, e.g. used in ground calibration as described above.

Additionally, according to some embodiments, the mobile unit may operate to perform timing recovery according to known preamble, or OFDM pilot having known modulation structure, in the transmitted beacon signal. The mobile unit may thus determine the exact time that it was received. The modulation scheme of the subcarrier in the OFDM signal may be identical among frames, providing the transmitted OFDM signal periodic from frame to frame, where the subcarriers provide channel state estimation (pilots subcarriers). The pilot subcarrier signals within the frames may act as preamble to find the time of arrival of the transmitted signal at the mobile unit. Further, as indicated above, the transmission station may periodically initiate synchronization process with the mobile units to determine synchronized clocks.

Figure 4:
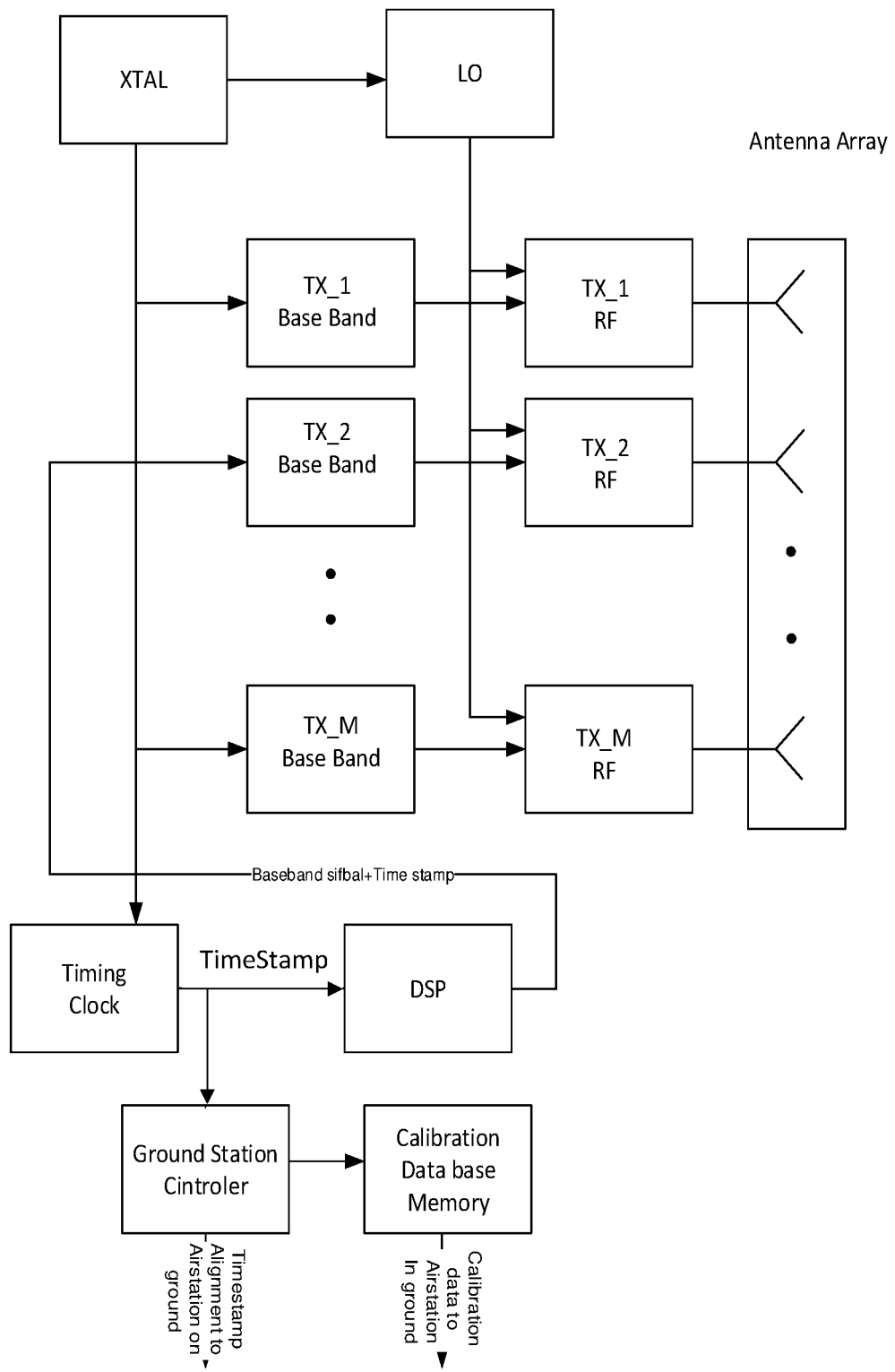
FIG. 4 exemplifies configuration diagram of the transmission station according to some embodiments of the present invention.

Reference is made to FIG. 4 exemplifying a block diagram of a transmissions station 100 according to some embodiments of the invention. As shown, the main aspects of the transmission station according to the present technique relate to transmission of beacon signals and enable clock synchronization when used. It should however be noted that the transmission station may also be associated with a control station providing additional control to the mobile units such as providing operational commands, instructions etc.

The transmission station utilizes a DSP unit configured to create signal copies within N baseband signal streams and to provide each stream to a dedicated antenna element of the antenna array, i.e. to antenna elements Tx_1 to Tx_M. These signal streams are converted to RF and transmitted through the N element antenna array.

The transmission station may also include system modules such as a reference clock, e.g. implemented through OCXO that feeds accurate timing clock. Generally, a time stamp of the timing clock is inserted periodically to the transmission signal stream. Other timestamps are sent in accordance with synchronization scheme.

Figure 5:
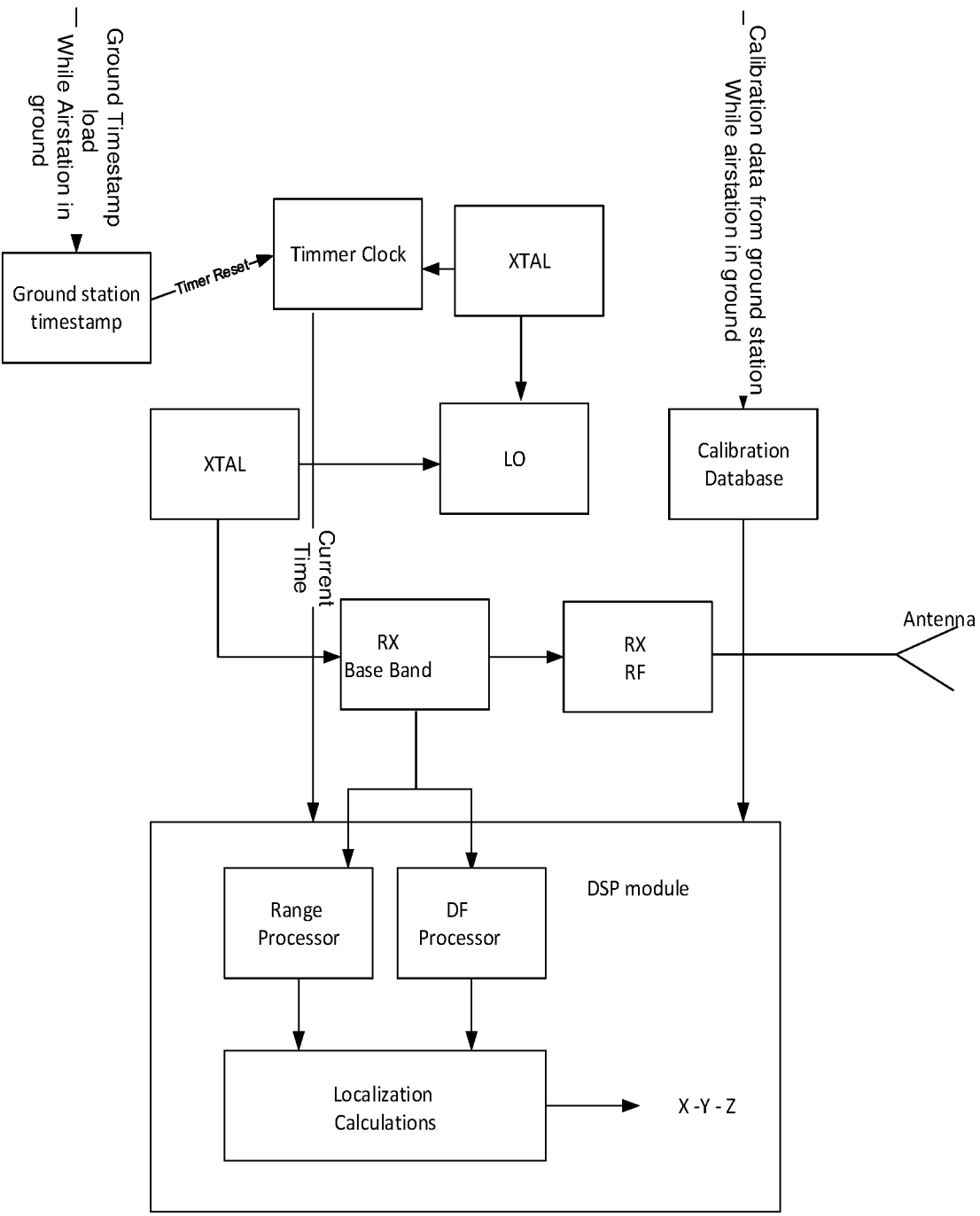
FIG. 5 exemplifies configuration diagram of a mobile unit according to some embodiments of the present invention.

Reference is made to FIG. 5 exemplifying a block diagram of a mobile unit according to some embodiments of the invention. As indicated, the active elements of the mobile units for the purposes of the present technique related to signal receiver and processor. It should however be noted that the mobile unit may include various other elements such as motor, wheels, rotors, camera, additional processing circuits, etc. selected and used for providing one or more selected applications for which the mobile unit 500 is used.

The processor generally include a digital signal processor DSP configured to extract the baseband of the received beacon signals and separate the streams that correspond to the different antenna elements in accordance with predetermined (pre stored) data on signal waveform). The processor thus determined AoD through DF or ToA processor and the distance range through ToA algorithm in the range processor.

As indicated, the DSP may use calibration data to compensate for delay offsets by calibration data, e.g. associated with electronic time delay for signal processing. Additional calibration data may be provided during ground calibration as indicated above.

The DSP may utilize timer clock of the mobile unit for determining time of arrival and determining range data. The current time and the recovered time of the ground station may both used for the ToA calculations.

The mobile unit may further be equipped with a reference clock such as Oven Controlled Crystal Oscillator (OCXO) based, that provides accurate timing clock. A timestamp that is written periodically from the ground station while the air station is in the ground may be used to align both timer clocks of the ground and the air stations prior launching.

As indicated above, the present technique may utilize OFDM link to combine both frequency domain channel state estimation for the DF process and communication channel for messaging protocol between the mobile unit and transmissions station. In such embodiments the communication channel may be bidirectional full duplex channel of uplink and downlink. There are two embodiment options for duplexing method of Frequency Division Duplex (FDD) and Time Division Duplex (TDD).

In FDD duplex downlink and uplink transmission occupy different frequency bands but it is important to recall that both transmissions are tightly synchronized to implement the clock synchronization. This duplexing method may have significant advantage if the communication channel is not be dedicated only to location functions but is also used for other purposes such as general communication and operational commands between the transmission station and mobile unit. For example, telemetry, control video and other dedicated data.

TDD synchronization may have advantage as both transmissions in TDD are inherently time synchronized as required for the time synchronization process. In the TDD embodiments the uplink channel is active most of the time with very low portion allocated to downlink.

In the last uplink frame or symbol of a signal the transmission station sends a poling message to the mobile units to send their current timestamp message. At that stage, the uplink transmission is muted for one or several downlink transmissions. The mute time is also determined by the propagation delay between both stations in both uplink and downlink direction. It should be noted that the poling is not required in case the communication frames of the DL-UL waveforms will be always periodic.

According to the present technique, a transmission station enables determining location data for one or more mobile unit. Specifically, the transmission station can transmit beacon signals to be received by a plurality of mobile unit allowing the mobile units to determine their location. To this end, the present technique may implement point to multipoint communication technique. This communication scheme is typically used in e.g. cellular communication such as LTE When utilizing OFDM transmission, this multiple mobile unit support is generally straightforward. For example, the multiple access method may use the Orthogonal frequency-division multiple access (OFDMA) protocol in both directions (and/or similar method such as SC-FDMA that are used in LTE-UL). Communication between the transmission station and mobile units may use a part of the frequency domain spectrum, where details of the spectrum are known to both sides a priory or publicly transmitted periodically as uplink message.

In some other embodiments only portions of the mobile units share the downlink channel when the downlink is active. Thus, any poling communication sequence may take place through several downlink active periods.

Since the transmission station may or may not be able to adjust the time of downlink transmission between the plurality of mobile units to receive data from the different mobile units in parallel, the transmission station may utilize long OFDM circular prefix guard to accommodate accepted performance with existing multipath scatterings.

It should be noted that as actual communication messages between the transmissions station and the one or more mobile units may be critical, and should preferably be separable from the beacon signals, such communication transmissions may employ channel coding. The channel coding can be any channel coding that known to skilled in the art.

Figure 6A:
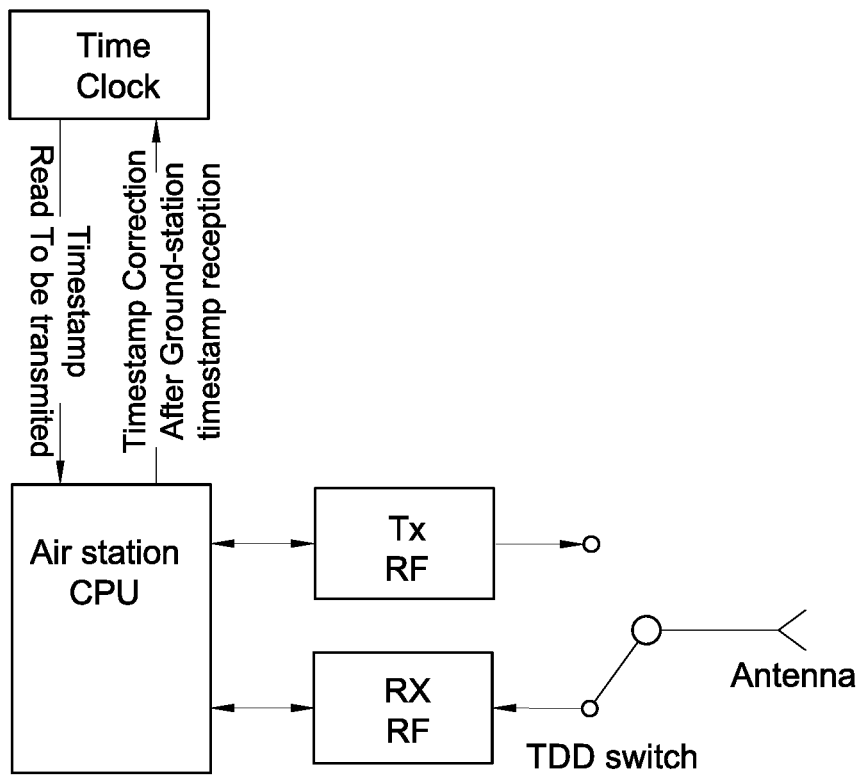
FIGS. 6A and 6B exemplify antenna-clock connection in mobile unit and transmissions station respectively according to some embodiments of the present invention.
Figure 6B:
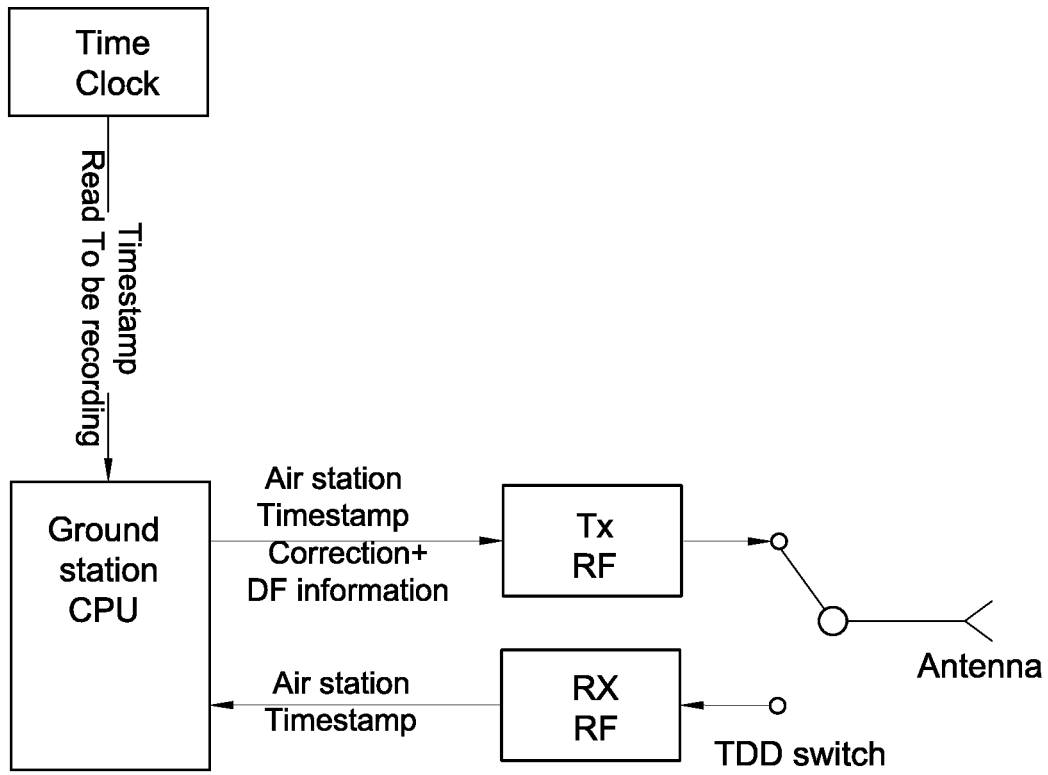

Reference is made to FIGS. 6A and 6B exemplifying certain configuration aspects of the mobile unit and transmission station, respectively. In this example, the communication protocol utilizes LTE downlink signal. FIG. 6A exemplifies the mobile unit including processor (CPU), receiving RX antenna module, and transmitting TX antenna module, and a clock unit. FIG. 6B exemplifies portions of the transmission station including processor (CPU), receiving RX antenna module, and transmitting TX antenna module, and a clock unit. As shown, the mobile unit generally configured to receive signals and communicate with the clock for data about time of receiving, as well as update the clock for time synchronization. The transmission station is generally operated to obtain timestamp data from the clock and include the timestamp in a transmitted signal.

Figure 7:
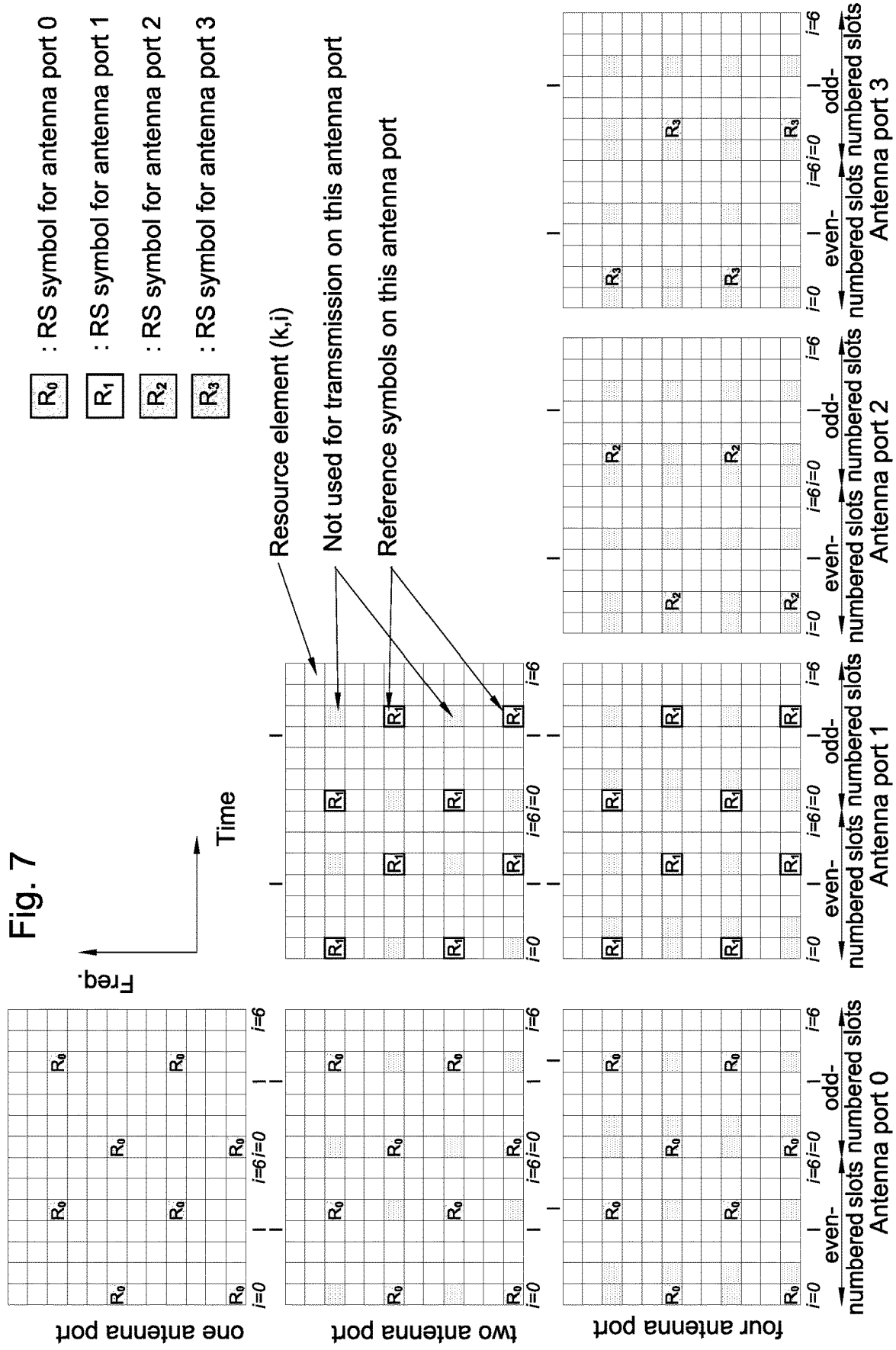
FIG. 7 exemplifies RS symbols used in certain configurations of OFDM communication as used in some embodiments of the present invention, e.g. associated with LTE transmission.

The transmission station transmitted signal may be any signal. In some configurations, the transmission station may use standard downlink LTE signal. The downlink LTE is constructed with OFDM symbols with 14 symbols per subframe (the normal CP). Subframe duration may be 1msec and frame duration is 10 msec (10 subframe). The pilot scheme is periodic around frames (10 msec). Reference is made to FIG. 7 illustrating RS symbols used in certain configurations of OFDM communication. FIG. 7 demonstrates the way pilots are arranged in 1 to 4 antennas into to be separable in the receiver of the user equipment. In some configurations, e.g. using Quadrature Phase Shift Keying (QPSK) modulation, the pilots may include random content with peaky auto correlation. When using QPSK modulated signal. The signal can be written as:

$$r_{l,n}(m) = \frac{1}{\sqrt{2}}(1 - 2c(2m)) + j\frac{1}{\sqrt{2}}(1 - 2c(2m+1))$$

where m is the RS index, n is the slot number of the radio frame, 1 is the symbol within the timeslot, c(i) is a pseudo random sequence formed of a 31 Gold sequence. The random process of the cell 31 Gold sequence may be produced with shift register implementation. The scrambling sequence generator may be reinitializing at the start of each OFDM symbol with the value that depends on cell identity and may generally be arbitrary.

Thus, the present technique provides for a mobile unit, transmissions station and communication therebetween, enabling determining position of the mobile units with respect to the transmission station. The present technique omits the need for triangulation from multiple ground stations, and enable determining location with respect to a single position using an antenna array and communication technique as described herein,

The invention claimed is:

1. A method for use in determining location of a mobile unit, the method comprising:
    transmitting at least one beacon signal from an antenna array formed by an array of antenna elements located in a predetermined position and having a common predetermined boresight facing, said array of antenna elements comprise an arrangement of a plurality of antenna elements with predetermined arrangement, wherein said antenna element being configured such that each antenna element transmits signal portion having orthogonal signal portions with respect to other antenna elements of the array;
    receiving said at least one beacon signal by the mobile unit and using a processor for determining location of said mobile unit with respect to said predetermined position, said processing utilizes determining data on at least one of time and phase variations between wireless channel states of signal portions received from the different antenna elements of the array for determining at least angular position of said mobile unit with respect to said boresight of said antenna array.

2. The method of claim 1, wherein said at least one beacon signal comprises at least transmission timestamp, said processing comprising determining time difference between said transmission timestamp and time of reception of said at least one beacon signals and using said time difference for determining data on distance of said mobile unit from said predetermined position of said antenna array.

3. The method of claim 2, wherein said determining time difference comprises determining frame start between said transmission timestamp and time of reception comprises determining recovered timing based of known signal portions received from the antenna elements.

4. The method of claim 1, comprising periodically transmitting said at least one beacon signal using fix duration frames that the transmitted start of frame is known to the mobile receiver during pre-launching period, determining initial start of frame received time by said mobile unit, and using in the difference between the transmitted and received start of frame for determining time of flight of the beacon signal.

5. The method of claim 1, wherein said antenna array comprises a selected number of N antenna elements, and wherein each antenna element j of said array is operated for transmitting a respective portion of said beacon signal being orthogonal to other portions of the beacon signal transmitted by other antenna elements.

6. The method of claim 1, wherein said transmitting at least one beacon signal from an antenna array comprises transmitting said beacon signal using at least one of: orthogonal frequency division multiplexing (OFDM), code-division multiple access (CDMA) Time Domain Multiple Access (TDMA) and Frequency division multiple access (FDMA).

7. The method of claim 6, wherein different antenna element of said antenna elements of the antenna array transmit orthogonal signal portions between them.

8. The method of claim 6, wherein each antenna element j of the antenna array is operated for transmitting signal portion using OFDM technique in one or more subcarrier frequencies selected from j, N+j, 2N+j . . . , thereby providing orthogonal subcarriers between the antenna elements.

9. The method of claim 1, comprising repeatedly transmitting beacon signals at a preselected transmission rate, thereby enabling to periodically determine location of said mobile unit.

10. The method of claim 1, wherein said antenna array is a two-dimensional array, said processing utilizes at least one of phase and amplitude variations between received signal portions for determining azimuth and elevation angle with respect to said boresight of said antenna array.

11. The method of claim 1, wherein said antenna array has rectangular or cross shaped arrangement of the antenna elements.

12. The method of claim 1, further comprising performing continuous wireless channel state estimation between the mobile unit and the antenna elements of the antenna array, thereby enabling to determine variations between received signal portions.

13. A receiver system for use in determining position, the system comprises an antenna element, and at least one processor; said antenna element is configured for collecting beacon signals transmitted from a transmitting station having predetermined location and antenna boresight heading, the beacon signal is formed of a plurality of signal portions having orthogonal subcarrier groups transmitted from corresponding plurality of antenna elements arranged of said antenna array;
said at least one processor is configured and operable to process the received beacon signal and determine data on at least one of time and phase variations in wireless channel states of signal portions received between said plurality of signal portions, to thereby determine angular position of said receiver system with respect to location and heading of said transmitting station.

14. The receiver system of claim 13, further comprising a memory utility comprising pre-provided data indicative of signal portion transmitted from different antenna elements, said at least one processor is configured and operable to utilize said pre-provided data and periodically determine wireless channel states transmitted from the different antenna elements.

15. The receiver system of claim 13, wherein said at least one processor further determines amplitude variations between said plurality of signal portions, to thereby determine said angular position of the receiver with respect to location and heading of said transmission station.

16. The receiver system of claim 13, wherein said at least one processor is further configured for extracting transmission timestamp from said received beacon signal and for determining time difference between transmission time indicated in said timestamp and time of reception of said beacon signal, and for determining therefrom data indicative of distance of said receiver unit with respect to aid predetermined location of said transmission station.

17. The receiver system of claim 13, configured for estimating and determining start of frame time measurement of said at least one beacon signal and predetermined data on fix duration frames used for periodic transmission of said beacon signal, and for determining initial start of frame by said mobile unit at known distance, and using periodic start of frame timing measurement variation compared to the initial start of frame is further beacon signals for determining time of flight of the beacon signal.

18. The receiver system of claim 13, further comprising at least one internal clock, wherein said receiver system is configured for periodically synchronizing said at least one clock in accordance with local time of said transmitting station.

19. The receiver system of claim 13, further comprising a time synchronization module configured and operable for bidirectional synchronization with said transmission station, said bidirectional synchronization comprises determining a timestamp error in accordance with double transmission path of synchronization signal between said receiver unit and said transmission station.

* * * * *